No. 878,186. PATENTED FEB. 4, 1908.
L. M. BYRNES & G. H. KENDRICK.
PISTON ROD PACKING.
APPLICATION FILED SEPT. 26, 1907.

WITNESSES:
L. L. Mead.
Elizabeth Bailey

INVENTORS
L. M. Byrnes
G. H. Kendrick
BY
Fowler & Bryson
ATTORNEYS

UNITED STATES PATENT OFFICE.

LEE M. BYRNES, OF ST. LOUIS, MISSOURI, AND GAYRIE H. KENDRICK, OF LITTLE ROCK, ARKANSAS.

PISTON-ROD PACKING.

No. 878,186.

Specification of Letters Patent.

Patented Feb. 4, 1908.

Application filed September 26, 1907. Serial No. 394,671.

*To all whom it may concern:*

Be it known that we, LEE M. BYRNES and GAYRIE H. KENDRICK, citizens of the United States, residing, respectively, at St. Louis, Missouri, and Little Rock, Arkansas, have invented a certain new and useful Piston-Rod Packing, of which the following is such a full, clear, and exact description as will enable any one skilled in the art to which it appertains to make and use the same, reference being had to the accompanying drawings, forming part of this specification.

Our invention relates more particularly to an elastic packing for piston rods, which is simple in construction and in which there is an even distribution of the pressure upon the rod.

Figure 1:
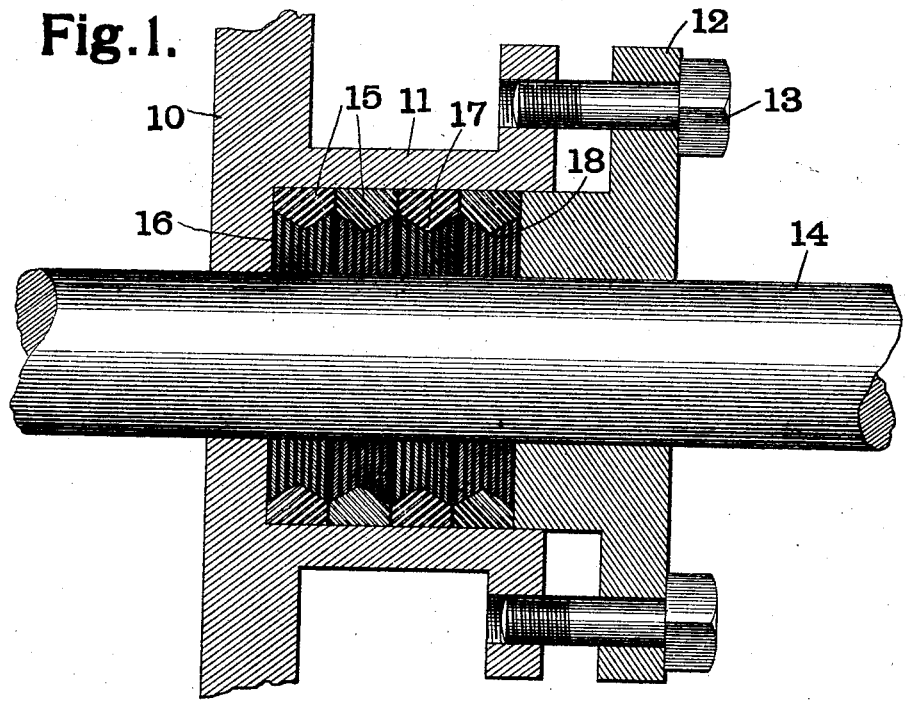
Figure 4:
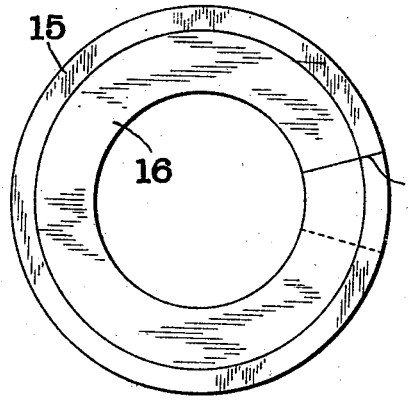
Figure 2:
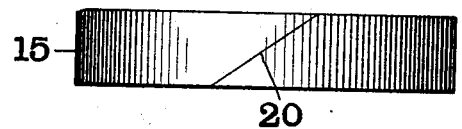
Figure 3:
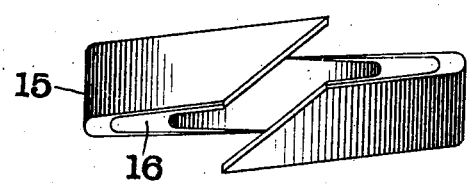

In the drawings, in which like marks of reference refer to similar parts in the different views, Figure 1 is a longitudinal section of a stuffing box containing our packing; Fig. 2 is a side elevation of one of the parts of which our packing is composed; Fig. 3 is a view of such part opened, and Fig. 4 a top view of one of the parts.

Referring first to Fig. 1, 10 is a portion of a piston head provided with the usual stuffing box 11, the outer end of which is closed by the gland 12 whose position may be regulated by the screw threaded bolts 13. The piston rod 14 is surrounded by these parts in the usual way. The packing is composed, as here shown, of four parts though the number may be greater or less than this. Each of these parts is composed of an outer ring 15 and an inner ring 16. The outer ring 15 is of rubber and its inner face protrudes to form a ridge 17, having two flat inclined sides. The apex of this ridge 17 is situated midway between the sides of the ring. This protruding face of the ring 15 bears against a face of corresponding shape on the outer side of the ring 16. As shown in the drawings, these faces exactly correspond and are in contact throughout their entire width, the outer face of the ring 16 being provided with a reëntrant angular indentation 18 for that purpose. The inner ring 16 is in contact at its inner face with the piston rod 14 and is composed of material less elastic than the rubber of the outer ring 15. In this case the rings 16 are composed of alternate layers of cotton duck and rubber prepared in the well known way that such bodies are customarily prepared for use in packing.

In the operation of our invention several of these parts are placed side by side, having their adjacent sides in contact with one another, as indicated in Fig. 1. This is done by slipping them over the shaft 14 and into the stuffing box 11 by means of the diagonal slit 20 through both the rings of which each of the parts is composed. This is best indicated in Fig. 3. After the parts have been assembled, the gland 12 is screwed up by means of the bolts 13, thus pressing the elastic rings together and by virtue of the peculiar shape of the outer face of the rings 16 and the inner face of the rings 15, the pressure thus produced is evenly distributed over the surface of the piston rod, producing a tight packing in which the pressure, and consequently the wear upon the packing is uniform.

Having fully described our invention, what we claim as new and desire to secure by Letters Patent of the United States is:

1. The combination with an elastic external strip provided with a protruding inner face, of a less elastic internal strip having an integral reëntrant external face in contact with the inner face of said first named strip.

2. The combination with an elastic external strip provided with an angular protruding inner face, of a less elastic internal strip having an angular reëntrant external face corresponding in shape with and in contact with said inner face.

3. The combination with an elastic external strip provided with an inner face having an angular protrusion centrally disposed on said face, of a less elastic internal strip provided with an external face having a reëntrant angle centrally placed in said face, and corresponding in shape with said angular protrusion, said faces being in contact throughout their entire area.

In testimony whereof we have hereunto set our hands and affixed our seals in the presence of the subscribing witnesses.

LEE M. BYRNES. [L. s.]
   GAYRIE H. KENDRICK. [L. s.]

Witnesses to the signature of Lee M. Byrnes:
  JAMES H. BRYSON,
  ELIZABETH BAILEY.

Witnesses to the signature of Gayrie H. Kendrick:
  E. SCHMIDT,
  A. W. O. KOOP.